United States Patent [19]

Bujas et al.

[11] 3,900,358

[45] Aug. 19, 1975

[54] PROCESS FOR MAKING A FUEL ELEMENT FOR HIGH TEMPERATURE NUCLEAR REACTORS

[75] Inventors: Roke Bujas; Claude Ringot, both of Gif-sur-Yvette, France

[73] Assignee: Commissariat a l'Energie Atomique, Paris, France

[22] Filed: Mar. 8, 1973

[21] Appl. No.: 339,292

Related U.S. Application Data

[63] Continuation of Ser. No. 213,283, Dec. 29, 1971, abandoned.

[30] Foreign Application Priority Data

Jan. 8, 1971 France .............................. 71.00543
Dec. 7, 1971 France .............................. 71.43837

[52] U.S. Cl. ............ 156/215; 176/82; 117/DIG. 11
[51] Int. Cl. ........................................... B29c 17/02
[58] Field of Search .............. 176/82; 156/293, 215; 8/140; 117/47 H, 46 CC, DIG. 11

[56] References Cited

UNITED STATES PATENTS 3,164,487 1/1965 Carley-Macauly et al............ 176/82
3,291,699 12/1966 Trickett et al........................ 176/68

*Primary Examiner*—Charles E. Van Horn
*Assistant Examiner*—Neal Kalishman
*Attorney, Agent, or Firm*—Cameron, Kerkam, Sutton, Stowell & Stowell

[57] ABSTRACT

The fuel element comprises a central fuel portion or compact of generally annular shape formed by a stack of annular segments and surrounded externally and internally by a jacket. The jacket is formed by at least one sheet of felt or fabric of carbon or graphite, the sheet being bonded to the fuel portion by means of pyrocarbon obtained by pyrolysis of hydrocarbons in gaseous phase. The fuel element is mainly intended for use in high-temperature reactors.

2 Claims, 1 Drawing Figure

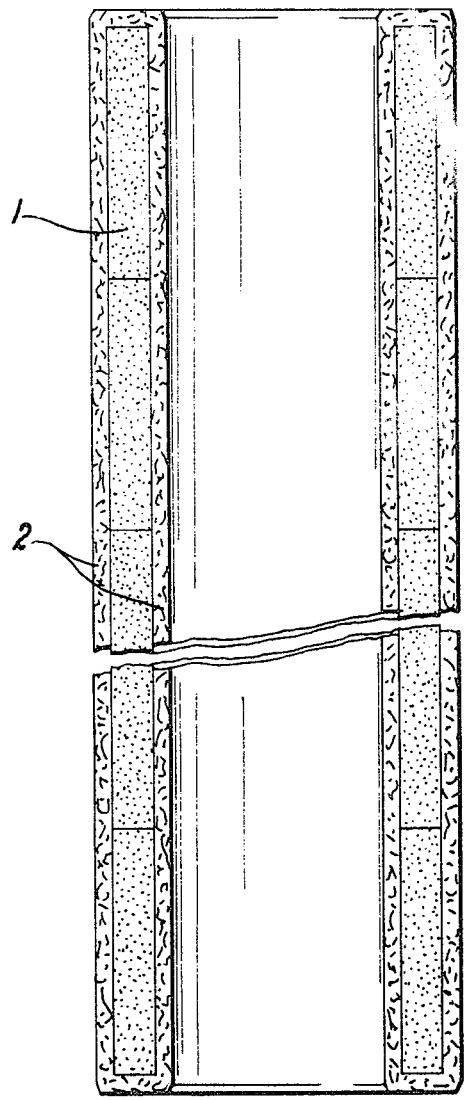

PROCESS FOR MAKING A FUEL ELEMENT FOR HIGH TEMPERATURE NUCLEAR REACTORS

This is a continuation of application Ser. No. 213,283, filed Dec. 29, 1971, now abandoned.

This invention relates to a fuel element for nuclear reactors and especially for the so-called high-temperature reactors in which the removal of heat generated by fission of the fuel is carried out by circulation of an inert fluid which is brought to a very high temperature.

In structures of this type which are at present in operation, the fuel elements usually comprise an inner graphite sleeve and outer graphite sleeve in coaxial relation, these sleeves or jackets being joined together at their extremities and defining between them an annular space in which is placed the fuel portion proper of the element. This portion is usually referred-to as a "compact" and consists of material formed of a carbonaceous matrix in which the fissile material is dispersed, especially in the form of oxide or carbide. During operation, fuel elements of this type undergo differential thermal expansions as well as dimensional variations resulting from irradiation of their constituent materials. In consequence, it is found that the fuel portion or compact comes into contact with the inner sleeve whilst the space formed between said compact and the outer sleeve increases. This gives rise to a number of disadvantages: in the first place, the temperature of the compact attains a higher value than when a uniform and continuous contact is established with the two surrounding sleeves whilst the space between the compact and the outer sleeve accordingly has the effect of limiting heat transfer to the coolant fluid. Moreover and as a direct consequence of this space, the temperature and the radial thermal gradient within the inner sleeve are higher than the temperature and the radial thermal gradient within the outer sleeve.

This invention relates to a fuel element for a high-temperature nuclear reactor which circumvents the above disadvantages and leads in particular to a considerable improvement in its operating performance, essentially by virtue of a better overall heat transfer between the compact and its two sleeves or jackets.

To this end, the fuel element under consideration which comprises a central fuel portion or compact of generally annular shape and surrounded by an outer and inner jacket is characterized in that said jacket is constituted by at least one sheet of felt or fabric of carbon or graphite which is bonded to the fuel portion.

In accordance with a particular characteristic feature, the fuel portion is formed by a stack of successive annular segments, the number of said segments being dependent on the final length of the fuel element.

In a first alternative embodiment, the sheet of felt or fabric is bonded to the fuel portion by means of pyrocarbon obtained by pyrolysis of hydrocarbons in gaseous phase. Preferably, the stack of annular segments is graphitized before being surrounded by the sheet of felt or fabric of carbon.

In another alternative embodiment, the sheet of felt or fabric is bonded to the fuel portion by means of a mixture of graphite powder and thermosetting resin with which the sheet is impregnated and is subjected to a heat treatment consisting of polymerization followed by curing and finally by outgassing. As an advantageous feature, the fuel portion is in turn impregnated with graphite powder mixed with thermosetting resin, the heat treatment being carried out on this fuel portion either before or at the same time as the heat treatment of the fabric or felt of carbon or graphite.

Finally and in accordance with another arrangement, the sheet of felt or fabric of carbon or graphite is provided with external or internal cooling fins in order to increase the heat-transfer surface area of the fuel element.

The fabrication of a fuel element in accordance with the invention makes it possible in particular to obtain throughout its structure a material which is substantially homogeneous within the felt or fabric of carbon or graphite which constitutes the inner and outer jackets and also within the fuel portion or compact. The sheet itself has a small thickness which limits thermal gradients; moreover, the felt or the fabric of carbon which constitutes the sheet advantageously performs a function which is similar to that of fibers, thereby increasing the tensile strength of the fuel element in a manner which is very similar to the characteristics exhibited by composite materials. Since the material of the sheet and the material which constitutes the carbonaceous matrix of the compact are largely of the same nature, deformations resulting from irradiation as well as thermal expansions will be very similar throughout the structure of the element. During operation, this will make it possible to maintain mutual contact between the different parts of the fuel element without giving rise to mechanical stresses which would affect the strength of the assembly as a whole.

The complementary description which now follows illustrates diagrammatically one exemplified embodiment of a fuel element in accordance with the invention as given by way of indication and not by way of limitation, reference being made to the single FIGURE of the accompanying drawing which is a longitudinal sectional view of said element.

As is apparent from this FIGURE, the fuel element comprises an internal portion consisting of a stack formed of a series of annular segments 1 of fuel material which is suited to operation in a high-temperature reactor, these segments being usually constituted by a carbonaceous matrix in which is dispersed a suitable fissile material usually made up of weakly enriched uranium carbide or oxide. This material is usually presented in the form of very small beads having a diameter which varies between 100 and 800 microns. In a first stage of fabrication, these beads are coated with one or a number of layers of silicon carbon or pyrocarbon having a total thickness which does not usually exceed 200 microns. These particles are then mixed with a graphite powder and then compacted for the fabrication of the segment 1. These annular segments 1 which constitute the fuel portion proper of the element, usually referred-to as a "compact", are then stacked one above the other to a height which corresponds to the length of the desired fuel element.

The stack of segments 1 which is thus formed is then surrounded both externally and internally by a sheet 2 of felt or fabric of carbon having a relatively small thickness and forming both an inner and outer jacket for the compact so as to isolate this latter from the coolant fluid which circulates in contact with this fuel element. Once it has been placed in position, said sheet 2 is subjected to an operation which consists in impregnation by pyrolysis of gaseous hydrocarbons and is carried out at a temperature between 800° and 1200°C, for example. If necessary, the segments 1 are graphitized before being surrounded by the sheet 2. Finally, cooling fins can be provided on the sheet 2 after this latter has been placed in position, these fins being either radial or disposed in any useful orientation and being also bonded to the jacket by the same method.

In the example of manufacture which has been described in the foregoing, the beads of fuel material are embedded in a carbonaceous matrix which is essentially formed of graphite powder. By way of alternative, it is an advantage to incorporate a thermosetting resin with this powder. Said resin can be of any suitable type which is known per se, especially of the phenol-formaldehyde or phenolic resin type. Use is preferably made of a resin which contains the highest percentage of carbonaceous residues after polymerization and curing.

The particles of coated fuel material which are mixed with the graphite powder and the resin are then compacted in the hot state, especially at a temperature higher than approximately 80°C at which the resin is in its most fluid state, in order to attain progressively 180°C at which the polymerization of this resin is considered to be effective, the treatment being carried out with moderate compression of the product which is being treated. There is obtained at the end of the operation a rigid product, preferably in the form of annular segments which are stacked as in the previous embodiment, thus forming the central portion of the final fuel element.

At this stage of manufacture, two alternative methods of operation can be contemplated: in the first method, the formed compacts are subjected to a curing treatment at 800°C which results in partial decomposition of the resin. In particular, this leaves a carbonaceous matrix in which the fuel particles are dispersed and agglomerated in a homogeneous manner. This treatment may then be followed if necessary by a final heating operation in vacuo at 1800°C for a predetermined period of time in order to ensure elimination of gas. The compacts thus formed are then assembled together, then coated with a fabric or a felt of graphite or carbon which is also impregnated with graphite powder mixed with the thermosetting resin. The complete assembly is given its final shape by hydraulic compression and subjected to a further consolidation treatment which is applicable essentially to the coating of impregnated felt or fabric; as stated earlier, this consists of a heat treatment for carrying out polymerization followed by curing and finally outgassing.

In an alternative method of operation, the fabric or felt of carbon or graphite which is impregnated with resin is placed in position prior to curing and outgassing of the compacts themselves, the two operations just mentioned being applied under these conditions not only to the outer covering of felt or of fabric but also to the compacts themselves, thus providing an intimate and homogeneous bond between these two portions themselves in the final element obtained.

As will be readily understood and as has already become apparent from the foregoing, it is self-evident that the invention is not limited in any respect to the examples of application which have been more especially contemplated but extends to all alternative arrangements.

What we claim is:

1. A process for making a fuel element for high temperature nuclear reactors comprising the steps of forming a central fuel compact of successive annular segments, impregnating at least one carbon fabric with a mixture of graphite powder and thermosetting resin, jacketing said compact internally and externally with said impregnated fabric and bonding said fabric to said compact by polymerization and curing of the thermosetting resin and degassing the fuel element.

2. A process for making a fuel element for high temperature nuclear reactors comprising the steps of forming a central fuel compact of successive annular segments containing a mixture of graphite powder and thermosetting resin, jacketing said compact internally and externally with at least one sheet of carbon fabric and bonding said fabric to said compact by polymerization and curing of the thermosetting resin and then degassing the fuel element.

* * * * *